United States Patent [19]

Tamura et al.

[11] Patent Number: 4,653,610
[45] Date of Patent: Mar. 31, 1987

[54] APPARATUS FOR AUTOMATICALLY APPLYING LUBRICATION IN LIFTING DEVICE

[75] Inventors: Tetsuji Tamura; Masahiko Sasaki, both of Tamano, Japan

[73] Assignee: Mitsui Engineering & Shipbuilding Co., Ltd., Tokyo, Japan

[21] Appl. No.: 789,539

[22] Filed: Oct. 21, 1985

[30] Foreign Application Priority Data

Oct. 24, 1984 [JP]  Japan .............................. 59-159755[U]
Nov. 29, 1984 [JP]  Japan .............................. 59-180082[U]

[51] Int. Cl.$^4$ .......................... F01M 9/10; B05G 1/04; F16H 57/04
[52] U.S. Cl. .................................. 184/6.12; 118/259; 74/468
[58] Field of Search ................. 184/6.12; 74/467, 468; 401/197, 268; 405/196, 198; 254/95–97; 118/259

[56] References Cited

U.S. PATENT DOCUMENTS

| | | | |
|---|---|---|---|
| 2,605,487 | 8/1952 | Bugg | 401/197 |
| 2,708,763 | 5/1955 | Jacoby | 401/197 |
| 2,892,439 | 6/1959 | Dynia | 118/259 |
| 3,436,161 | 4/1969 | Charos | 401/197 |
| 3,738,452 | 6/1973 | Hausinger | 184/6.12 |
| 3,763,959 | 10/1973 | Neugebauer | 74/468 |
| 3,826,581 | 7/1974 | Henderson | 401/197 |
| 3,936,549 | 2/1976 | Kohler | 118/259 |
| 3,986,368 | 10/1976 | Levingston | 405/196 |
| 4,175,300 | 11/1979 | McGlew | 401/197 |

Primary Examiner—Carlton R. Croyle
Assistant Examiner—Jane E. Obee
Attorney, Agent, or Firm—Armstrong, Nikaido, Marmelstein & Kubovcik

[57] ABSTRACT

Disclosed is apparatus for automatically applying lubricant in a lifting device which raises and lowers a platform by intermeshing of pinions of a jack-up device mounted on the platform and racks provided in the longitudinal direction of legs for supporting the platform, rockable arms supported by a frame of the jack-up device being provided above the pinion meshing with the rack, a roller brush being rotatably provided on the rockable arms so as to come into sliding contact with the pinion, and a lubricant supplying device being connected to the roller brush.

4 Claims, 12 Drawing Figures

APPARATUS FOR AUTOMATICALLY APPLYING LUBRICATION IN LIFTING DEVICE

BACKGROUND OF THE INVENTION

This invention relates to apparatus for automatically applying lubrication in a lifting device of an offshore platform, and more particularly, to apparatus for automatically applying lubrication to a pinion which meshes with a rack of the lifting device.

A conventional offshore platform of bedding and lifting type is composed of a substructure consisting of a plurality of legs, a platform, and a jack-up device provided on the platform, and the platform is raised and lowered by intermeshing of the pinions of the jack-up device with the racks provided on each leg, and rotating the pinions by a motor.

Since the platform is considerably heavy, the weight of the platform is applied directly to the intermeshing surfaces of the racks and pinions in lifting or lowering the platform, thereby increasing the contact pressure. As a result, the racks and pinions are greatly damaged by the friction at the time of their intermeshing.

To prevent this, lubricant such as grease is conventionally applied to the intermeshing surfaces of the racks with a brush or a roller brush.

However, when lubricant is manually applied with a brush or a roller brush, it is difficult to constantly apply it uniformly, and much labor and time is required. Furthermore, the working atmosphere requires lubricant to be applied from above the frame of the jack-up device, and therefore it is difficult to apply lubricant when the platform is lowered.

SUMMARY OF THE INVENTION

Accordingly, it is an object of the present invention to solve the problems in the prior art and to provide apparatus for applying lubricant to a lifting device capable of automatic, uniform, and efficient application whether a platform is being raised or lowered.

To achieve this aim, the present invention provides apparatus for applying lubricant to a jack-up device which is elevated or lowered by meshing of racks provided in the longitudinal direction of the legs for supporting a platform with pinions of a jack-up device placed on the platform, comprising: a rocking arm supported by the frame of a jack-up device at an upper portion of the pinion which meshes with a rack; a roller brush which is rotatably provided on the rocking arm so as to come into sliding contact with a pinion by virtue of its own weight; and a lubricant supplying device which is connected to the roller brush.

The above-described structure ensures automatic, uniform application of lubricant to the intermeshing surface of a pinion without much labor, and efficient supply and application can be conducted without the need of manpower which is essential in the prior art.

The above and other objects, features and advantages of the present invention will become clear from the following description of the preferred embodiment thereof, taken in conjunction with the accompanying drawings.

DESCRIPTION OF THE PREFERRED EMBODIMENTS

Figure 1:
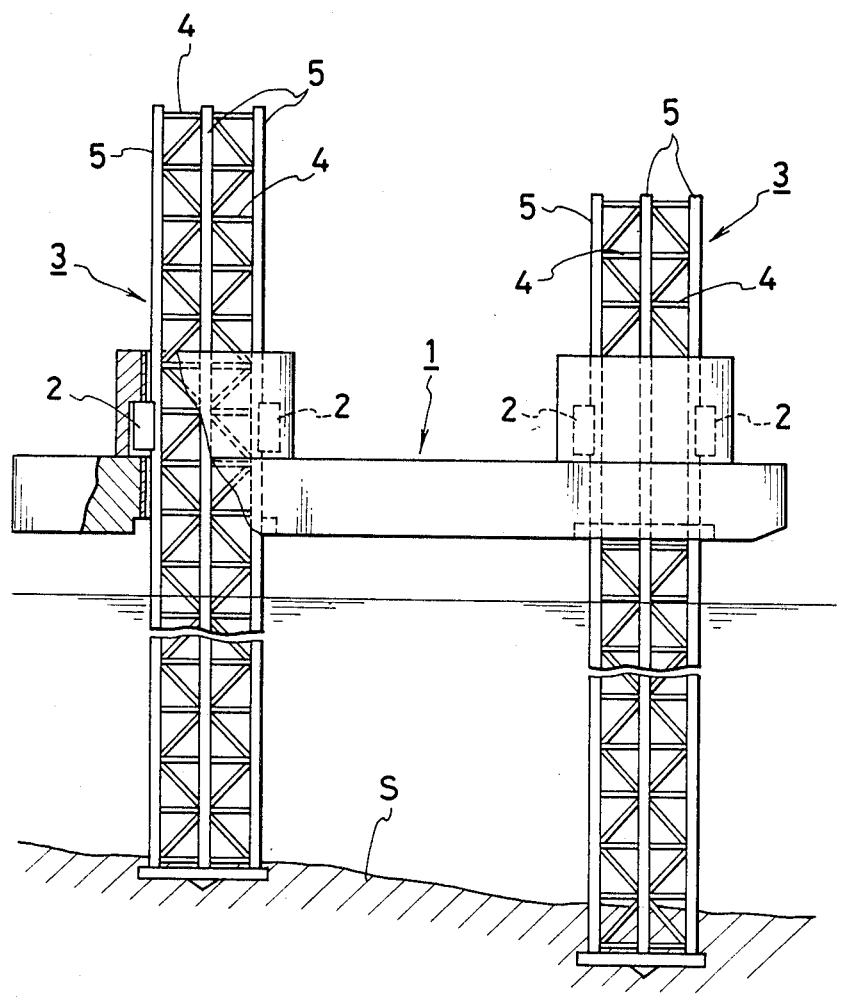
FIG. 1 is a schematic elevational view, partially in section, of a bedding and lifting type offshore platform.

Referring first to FIG. 1, which schematically shows a bedding and lifting type offshore platform, a jack-up device 2 is provided on a platform 1 which is supported by a substructure consisting of a plurality of legs 3 in such a manner that it is capable of being elevated and lowered.

Each leg 3 is composed of, for example, three or four chords 5 and connecting rods 4 which connect the chords 5 to each other such that the leg 3 has the configuration of a tower. The substructure is set up on the seabed S.

Figure 2:
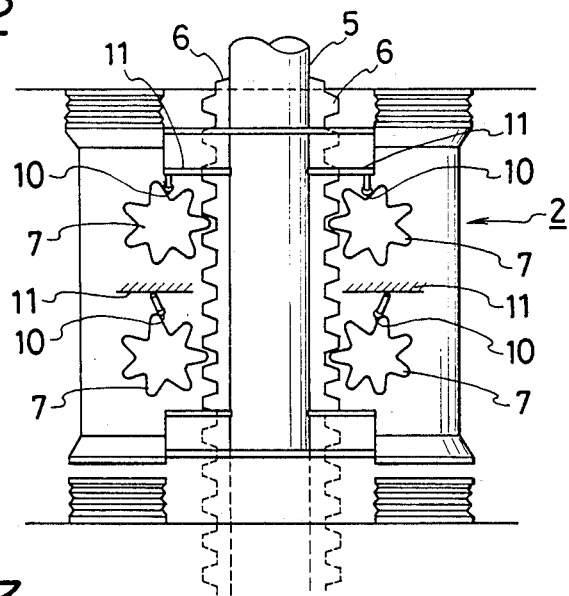
FIG. 2 is a schematic elevational view of a jack-up device.

Racks 6 are mounted on the chord 5 constituting the leg 3 in the longitudinal direction of the leg, as shown in FIG. 2, and a plurality of pinions 7 provided in the jack-up device are meshed with the racks 6. The number of pinions 7 is shown to be four in FIG. 2, but it is not limited to four.

Figure 3:
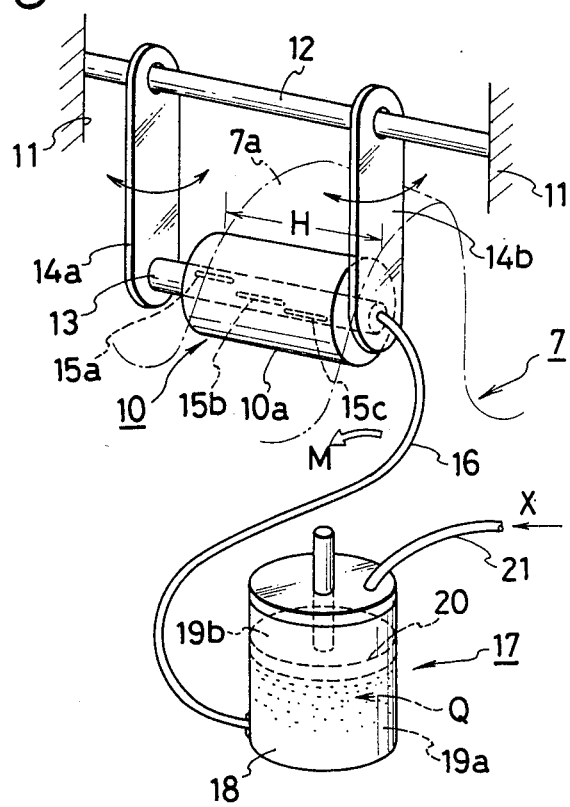
FIG. 3 is a perspective view of a roller brush in its attached state.

A roller brush 10 for applying lubricant Q such as grease to the outer peripheral surface of the pinion 7 is provided above the pinion 7, as is shown in FIG. 3.

A support 12 is horizontally installed on a frame 11 of the jack-up device 2, and two rockable arms 14a and 14b for supporting both ends of a support shaft 13 are rockably provided on the support 12 perpendicular to the latter. The roller brush 10 is rotatably provided on the support shaft 13.

The roller brush 10 is formed of a material which a lubricant can permeate, such as sponge, and has a cylindrical configuration with a width substantially as large as, or slightly larger than, the face width H of the pinion 7.

The support shaft 13 is in the form of a hollow cylinder with both ends blocked by the rockable arms 14a and 14b. The support shaft 13 is provided with a plurality of (three, in this embodiment) slits 15a, 15b and 15c at the portion facing the roller brush 10 in the longitudinal direction of the support shaft 13. These slits are formed out of alignment with each other, their positions being shifted consecutively in the circumferential direction in order to prevent overlapping of their phases.

A lubricant supplying device 17 is connected to one end of the support shaft 13 through a lubricant supply pipe 16. The lubricant supplying device 17 is composed of a lubricant supply cylinder 18, a piston 20 which defines the interior of the lubricant supply cylinder 18 as a lubricant chamber 19a and a pressure chamber 19b, and a pressure supply pipe 21 for introducing high-pressure air X (not shown) into the pressure chamber 19b. When the pressure of the high-pressure air X is applied to the upper surface of the piston 20, the lubricant Q in the lubricant chamber 19a is supplied to the interior of the support shaft 13 through the supply pipe 16.

Figure 4:
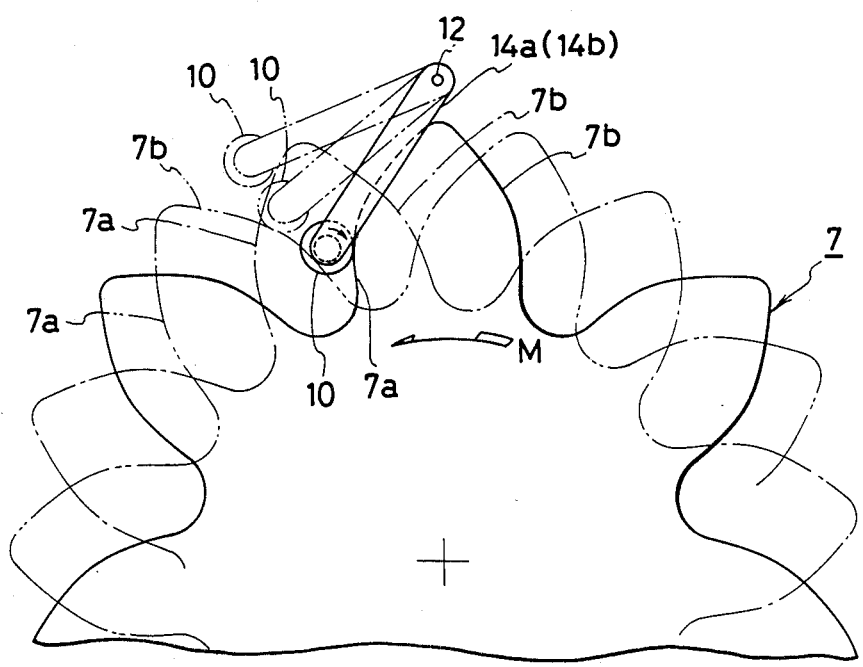
FIG. 4 is an explanatory view of application of lubricant.

The operation of the apparatus according to the invention having the above-described structure will now be explained with reference to FIGS. 3 and 4.

While the roller brush 10 is in sliding contact with the tooth surface 7a of the suspended pinion 7 by virtue of its own weight through the rockable arms 14a and 14b, the lubricant Q is first supplied from the lubricant supplying device 17 to the hollow portion of the support shaft 13 which supports the roller brush 10. The lubricant Q flows out of the slits 15a, 15b and 15c formed on the support shaft 13, is pushed onto the peripheral surface 10a of the roller brush 10, and adheres to the tooth surface 7a of the pinion 7. When the pinion 7 is next rotated in this state in the direction indicated by an arrow M in FIG. 4, the roller brush 10 which is in sliding contact with the tooth surface 7a of the pinion 7 moves along the tooth profile of the pinion 7 while rotating from the position indicated by the solid line to the position indicated by the one-dot and one-dash line in FIG. 4.

When the pinion is further rotated in the direction indicated by the arrow M, the roller brush 10 moves to the tooth surface 7b of the pinion 7, as is indicated by the two-dot and one-dash line, and the lubricant Q is applied also to this surface.

In this way, the lubricant Q is automatically applied with the lifting motion of the platform 1, to the entire surfaces 7a and 7b of the pinion 7 which is meshed with the rack 6. While the platform 1 is being lowered, the pinion 7 is rotated in the reverse direction with respect to the direction indicated by the arrow M, and the lubricant Q is also applied to the entire tooth surfaces 7a and 7b of the pinion 7.

Figure 5:
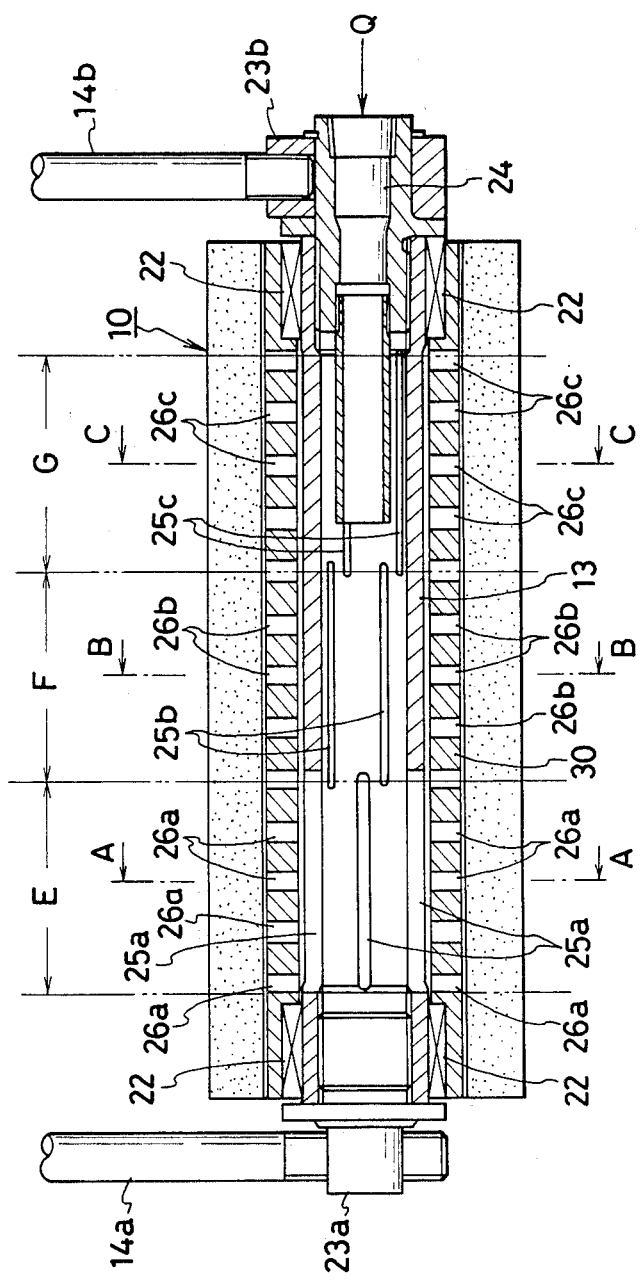
FIG. 5 is a sectional view of another example of a roller brush.

Referring now to FIG. 5 showing another example of the roller brush, the cylindrical roller brush 10 which a lubricant can permeate is fitted over a cylindrical roller brush shaft 30. The roller brush shaft 30 is rotatably fitted over the support shaft 13 through bearings 22.

The support shaft 13 is secured to the rockable arms 14a and 14b through fitting members 23a and 23b. The fitting member 23a seals one end of the support shaft 13 and the fitting member 23b has a through hole 24 which communicates into the hollow portion of the support shaft 13. The lubricant Q is supplied into the support shaft 13 through the through hole 24.

The roller brush 10 is divided in the longitudinal direction thereof into a plurality of (three, in this embodiment) lubricant distribution zones E, F and G.

Figure 6:
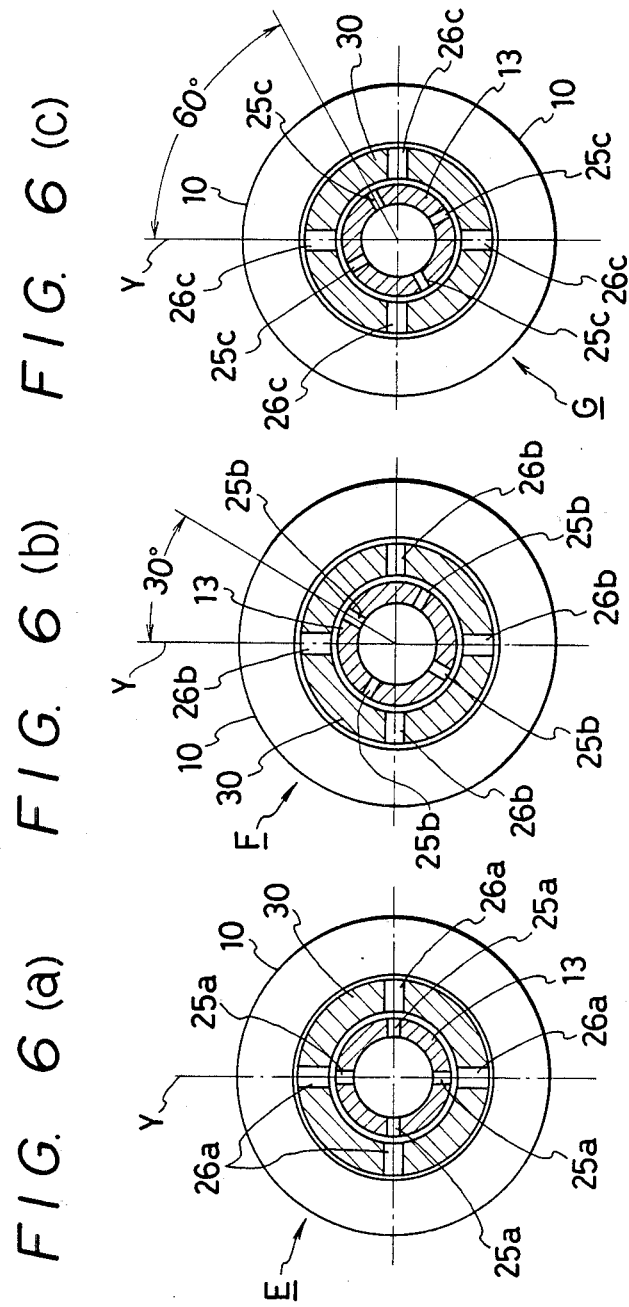
FIGS. 6(a), 6(b) and 6(c) are sectional views of the roller brush shown in FIG. 5, taken along the lines A—A, B—B and C—C in FIG. 5, respectively.
Figure 7:
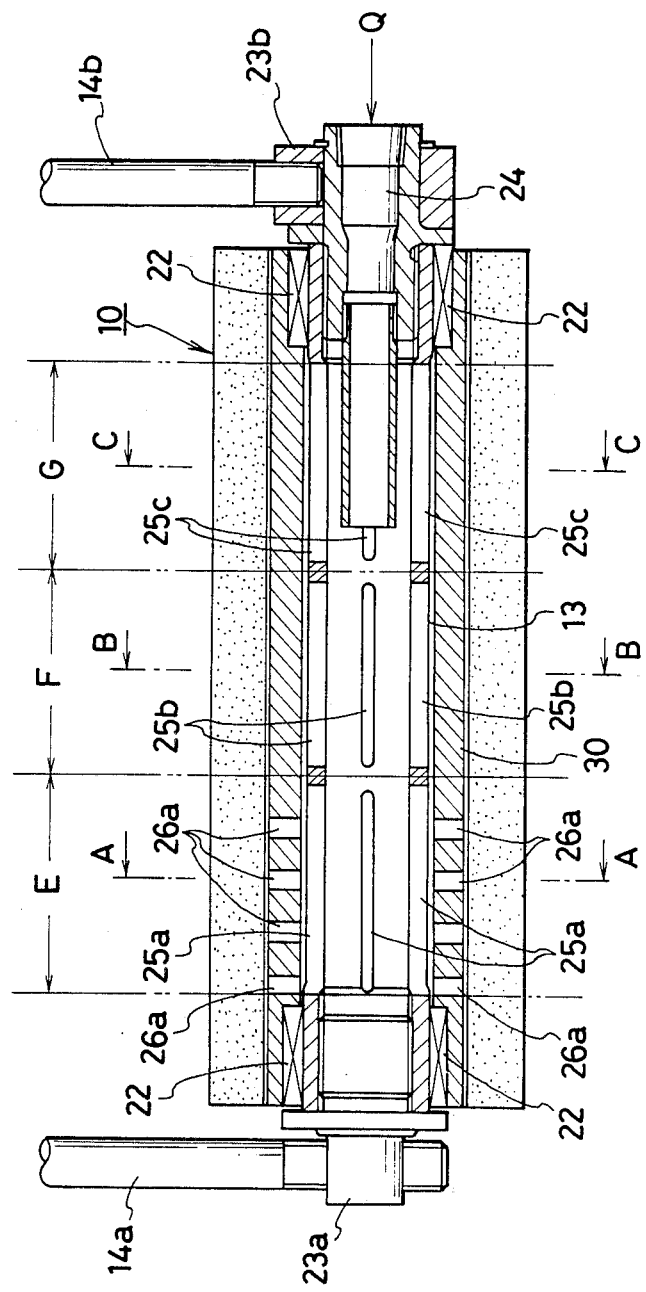
FIG. 7 is a sectional view of still another example of the roller brush.

A plurality of slits 25a are provided in the distribution zone E of the support shaft 13 at circumferentially regular intervals, as shown in FIG. 6(a). Similarly, a plurality of slits 25b are provided in the distribution zone F of the support shaft 13 at circumferentially regular intervals, as shown in FIG. 6(b). Further, a plurality of slits 25c are provided in the distribution zone G of the support shaft 13 at circumferentially regular intervals, as shown in FIG. 6(c).

The slit 25a in the distribution zone E, the slit 25b in the distribution zone F and the slit 25c in the distribution zone G are so arranged that their respective phases differ by 30°.

That is, when the perpendicular Y which is drawn through the center of the support shaft 13 and the position of one of the slits 25a in the distribution zone E come into alignment, as shown in FIG. 6(a), one of the slits 25b in the distribution zone F is situated 30° apart from the perpendicular Y, as shown in FIG. 6(b), and one of the slits 25c in the distribution zone G is situated 60° apart from the perpendicular Y, as shown in FIG. 6(c).

On the other hand, in the distribution zone E of the roller brush shaft 30, a plurality of holes 26a are provided at circumferentially regular intervals, as shown in FIG. 6(a). Several units of the plurality of holes 26a are provided in the distribution zone E of the roller brush shaft 30. Similarly, a plurality of holes 26b are provided in the distribution zone F of the roller brush shaft 30 at circumferentially regular intervals, as shown in FIG. 6(b). Several units of the plurality of holes 26b are provided in the distribution zone F of the roller brush shaft 30. Further, a plurality of holes 26c are provided in the distribution zone G of the roller brush shaft 30 at circumferentially regular intervals, as shown in FIG. 6(c). Several units of the plurality of holes 26b are provided in the distribution zone F of the roller brush shaft 30.

The hole 26a in the distribution zone E, the hole 26b in the distribution zone F, and the hole 26c in the distribution zone G are arranged so as to be of the same phase, as shown in FIGS. 6(a), 6(b) and 6(c).

The above-described structure enables the following operation. When the roller brush 10 is rotated, the phases of the slits 25a and the holes 26a in the distribution zone E come into alignment with each other first, and the lubricant Q is supplied to the distribution zone E of the roller brush 10 through the slits 25a and the holes 26a. The phases of the slits 25b and the holes 26b in the distribution zone F next come into agreement, and the lubricant Q is supplied to the distribution zone F of the roller brush 10 through the slits 25b and the holes 26b. Then the phases of the slits 25c and the holes 26c in the distribution zone G come into alignment, and the lubricant Q is supplied to the distribution zone G of the roller brush 10 through slits 25c and holes 26c.

As a result, the lubricant Q is distributed uniformly in the axial direction of the roller brush 10. Accordingly, the lubricant Q to be applied to the tooth surface of the pinion 7 is distributed in the direction of the face width of the pinion, as well.

Figures 8A, 8B, 8C:
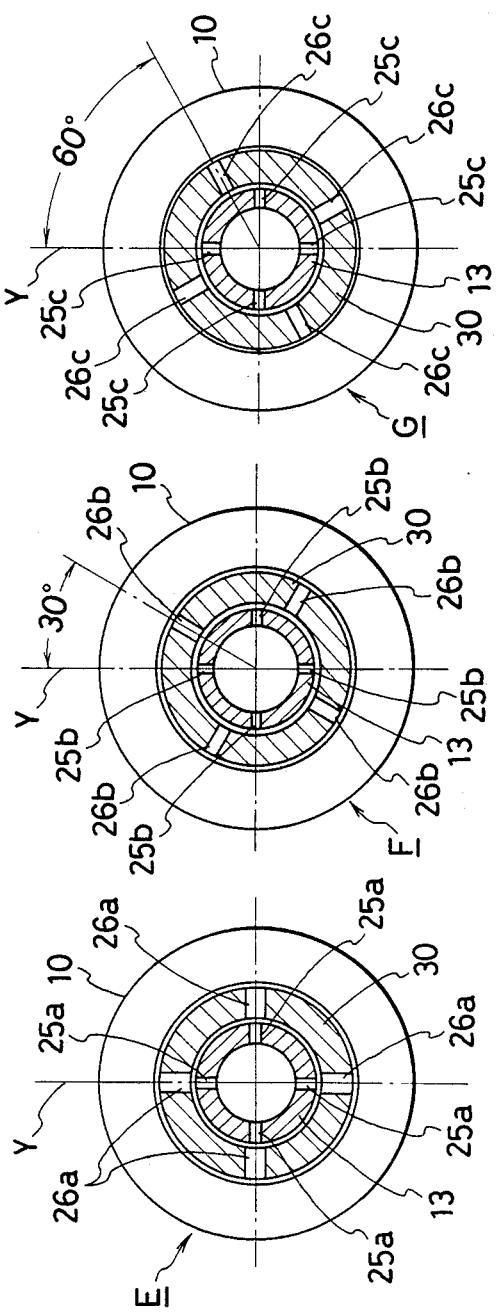
FIGS. 8(a), 8(b) and 8(c) are sectional views of the roller brush shown in FIG. 7, taken along the lines A—A, B—B and C—C in FIG. 7, respectively.

The same effects are obtained by arranging the holes 26a, 26b and 26c on the roller brush shaft 30 such that their respective positions on the circumference thereof differ by 30° from each other, and forming the slits 25a, 25b and 25c on the support shaft so as to be of the same phase, as shown in FIGS. 8(a), 8(b) and 8(c). In this case, when the perpendicular Y drawn through the center of the support shaft 13 and the position of the hole 26a in the distribution zone E come into alignment as shown in FIG. 8(a), the hole 26b in the distribution zone F is situated 30° apart from the perpendicular Y as shown in FIG. 8(b), and the hole 26c in the distribution zone G is situated 60° apart from the perpendicular Y as shown in FIG. 8(c).

While there has been described in the above what is at present considered to be preferred embodiments of the invention, it will be understood that various modifications may be made thereto, and it is intended that the appended claims cover all such modifications as fall within the true spirit and scope of the invention.

What is claimed is:

1. Apparatus for automatically applying lubricant in a lifting device which raises and lowers a platform by meshing of pinions of a jack-up device mounted on said platform with racks provided in the longitudinal direction of legs for supporting said platform, said apparatus comprising: rockable arms supported by a frame of said jack-up device and provided above said pinion meshing with said rack; a roller brush which is rotatably provided on said rockable arms so as to come into sliding contact with said pinion; and a lubricant supplying device which is connected to said roller brush.

2. Apparatus for automatically applying lubricant in a lifting device according to claim 1, wherein said rockable arms are secured to a hollow cylindrical support shaft which rotatably supports said roller brush and which is provided with a plurality of liquid passages in the longitudinal direction thereof, said liquid passages being disposed so that their respective positions differ from each other in the circumferential direction of said support shaft so as to prevent overlapping of phases of said liquid passages.

3. Apparatus for automatically applying lubricant in a lifting device according to claim 1, wherein said rockable arms are secured to a hollow cylindrical support shaft, which is rotatably provided with a cylindrical roller brush shaft with said roller brush fitted thereover; a plurality of liquid passages are provided at circumferentially regular intervals on said support shaft in each lubricant distribution zone of said support shaft which is divided in the longitudinal direction thereof, said liquid passages in each distribution zone being disposed so that respective positions thereof differ from each other in the circumferential direction of said support shaft so as to prevent overlapping of the phases of said liquid passages; and a plurality of liquid passages are provided at circumferentially regular intervals in each lubricant distribution zone of said roller brush which is divided in the longitudinal direction thereof, said liquid passages in each distribution zone being disposed so as to be of a same phase.

4. Apparatus for automatically applying lubricant in a lifting device according to claim 3, wherein said liquid passages provided on said support shaft are so arranged in each distribution zone as to be of a same phase and said liquid passages provided on said roller brush shaft are disposed so that the respective positions thereof differ from each other in the circumferential direction of said roller brush shaft so as to be of different phases.

* * * * *